(No Model.) 3 Sheets—Sheet 1.

J. W. ECKERD.
WATER ELEVATOR AND CARRIER.

No. 563,461. Patented July 7, 1896.

Witnesses:
C. F. Wilcox
R. G. Orwig

Inventor: John W. Eckerd,
By Thomas G. and J. Ralph Orwig.
Attorneys.

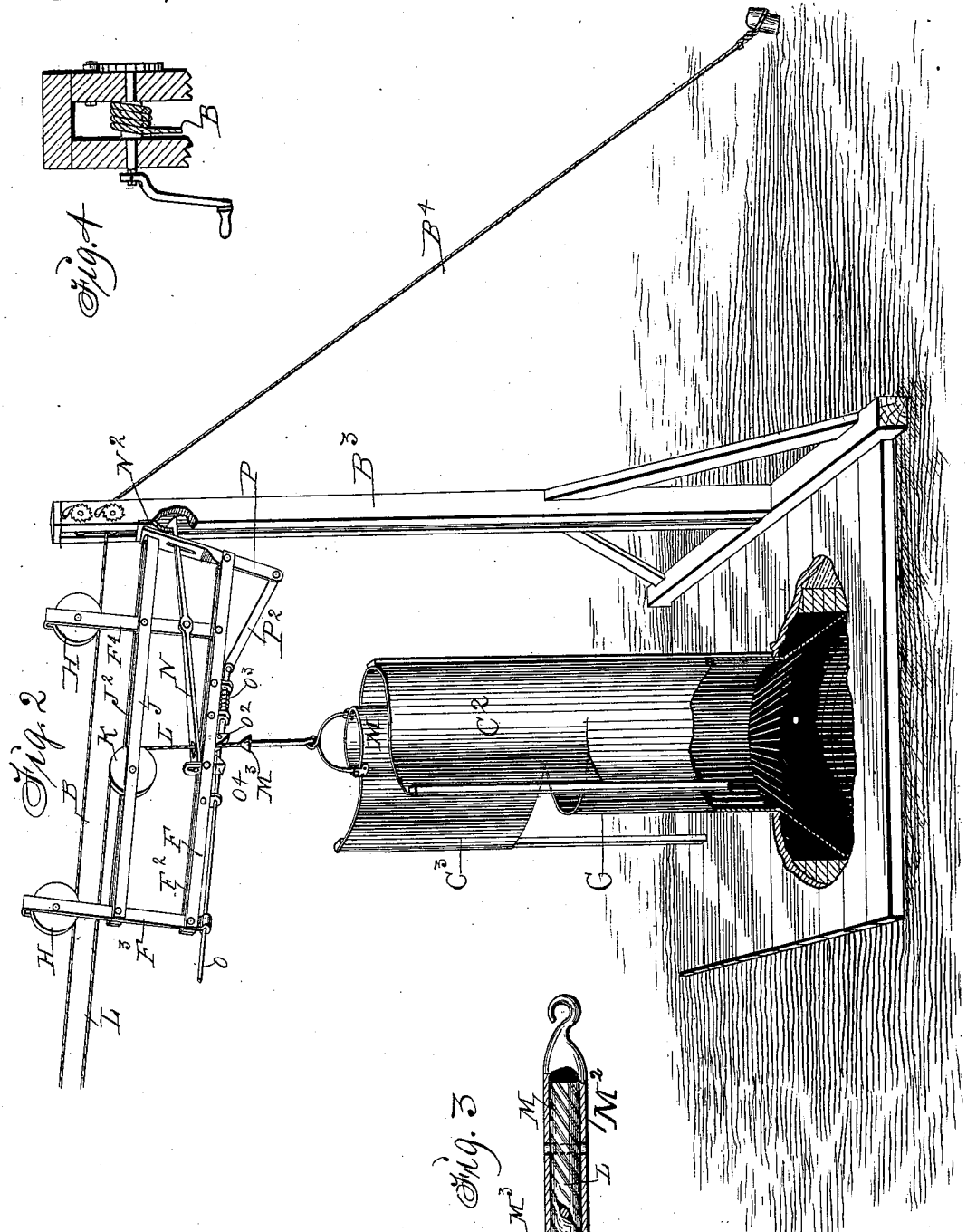

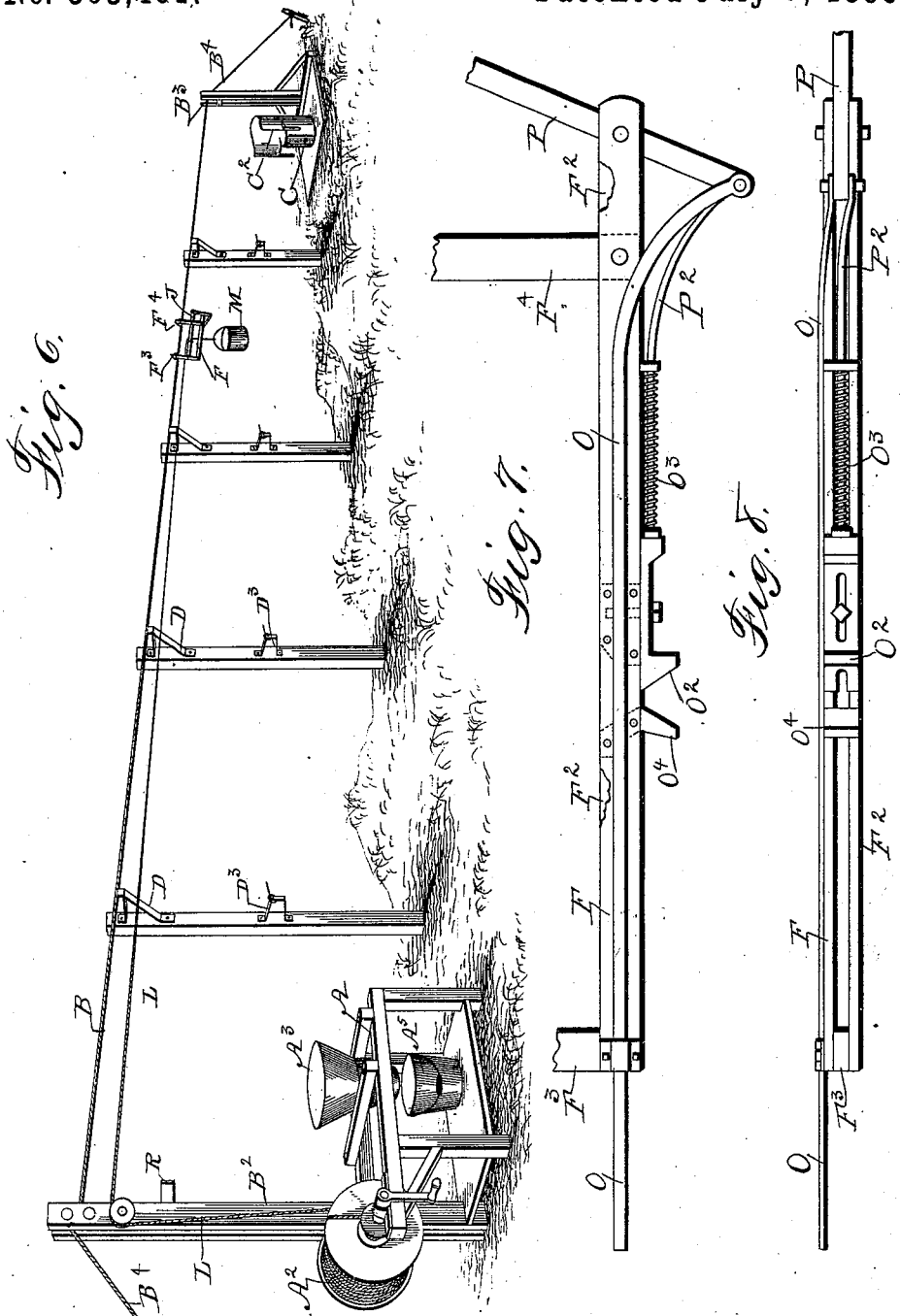

UNITED STATES PATENT OFFICE.

JOHN W. ECKERD, OF DRAKESVILLE, IOWA, ASSIGNOR OF ONE-HALF TO S. G. W. STOKES, OF BLOOMFIELD, IOWA.

WATER ELEVATOR AND CARRIER.

SPECIFICATION forming part of Letters Patent No. 563,461, dated July 7, 1896.

Application filed February 8, 1896. Serial No. 578,618. (No model.)

*To all whom it may concern:*

Be it known that I, JOHN W. ECKERD, a citizen of the United States, residing at Drakesville, in the county of Davis and State of Iowa, have invented a Water Elevator and Carrier, of which the following is a specification.

My object is to save time and labor in drawing water from a well and delivering it at some distance from the well; and my invention consists in the construction, arrangement, and combination of operative mechanism with a line of fixed posts and a wire stretched along the tops of the posts, as hereinafter set forth, pointed out in my claims, and illustrated in the accompanying drawings, in which—

Figure 5:
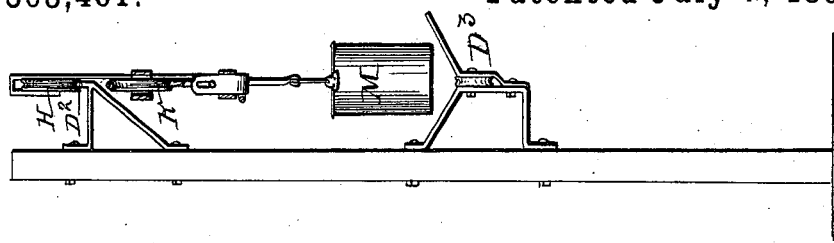
Figure 1:
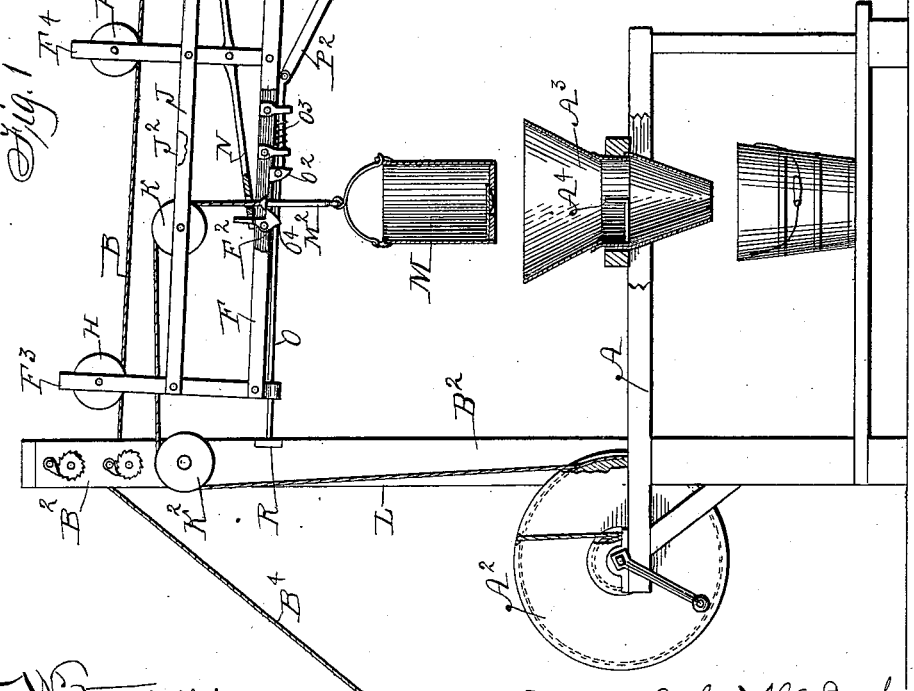

Figure 1 shows one end of a line of posts and a bucket-carrier suspended on the wire fixed to the posts, a windlass and platform, and a bucket suspended from the bucket-carrier and connected with a rope fixed to the windlass. Fig. 2 is a perspective view showing the post at the end of the line of fixed posts at the side of a well and the bucket-carrier detachably connected with the posts and the bucket depending therefrom and between portions of a well-curb adapted to direct the bucket in passing to and from the well. Fig. 3 is an enlarged sectional view of a device adapted to inclose and fasten the end of the rope, to detachably connect a bucket with the rope, and to detachably fasten the rope to the bucket-carrier. Fig. 4 is an enlarged sectional view of the top of one of the posts, showing a pulley and ratchet for fastening and stretching a wire rope or cable connected therewith. Fig. 5 shows one of the line of posts having fixed brackets at their top portions to support the fixed wire and fixed brackets at their lower portions to support the rope that is connected with the drum of the windlass and the bucket when the rope sags along the line of posts. Fig. 6 is a perspective view showing the complete apparatus in position as required for practical use. Figs. 7 and 8 are enlarged detail views of the bucket-carrier.

In Fig. 1 the letter A designates a platform at the end of the line of posts where water is to be delivered. $A^2$ is a windlass connected with the platform A, and $A^3$ is a funnel fitted and fixed in an opening in the platform and provided with a pin $A^4$, adapted to open a valve in the bottom of a bucket as the bucket is lowered into the top of the funnel and as required to automatically empty water from the bucket into a receptacle $A^5$, placed under the funnel and platform.

B is a wire or cable fixed to the end posts $B^2$ and $B^3$ by means of pulleys and ratchets, as shown in Fig. 4, or in any suitable way, so it can be stretched and kept taut.

$B^4$ are guy-ropes or cables fixed to stakes in the ground and to the tops of the end posts B and $B^2$, by means of pulleys, and ratchets in such a manner that they can be stretched and maintained taut to aid in keeping the line of posts perpendicular and the wire B at a proper tension to support a traveling bucket-carrier and bucket suspended from the carrier as required to elevate and convey water from a well to the receptacle under the platform A.

C is a well-curb, preferably made of sheet metal and provided with wings $C^2$ and $C^3$ at its top adapted to direct the bucket in passing in and out of the well.

The posts that are fixed in the line of posts between the end posts $B^2$ and $B^3$ have fixed brackets D at their tops, and each bracket is provided with an upward projection $D^2$, that is concave at its top and adapted to support the wire B.

Brackets $D^3$ are fixed to the same posts at a lower point and provided with pulleys and outward projections to support the rope that operates the bucket when it sags while the bucket is empty and traveling toward the well.

F and $F^2$ are the mating lower parallel bars of the frame of the bucket-carrier, and $F^3$ and $F^4$ are uprights fixed between them and provided with pulleys H at their free top ends.

J and $J^2$ are bars fixed against the outside faces of the uprights, and K is a pulley between them. $K^2$ is a pulley attached to the post $B^2$, and L is a rope or cable fixed to the drum of the windlass $A^2$ and extended over the pulleys $K^2$ and K to support and carry a bucket M, detachably connected with the free end of the rope, by means of a tube $M^2$, that has a hook at one end to engage the bail of the bucket, and an annular conical enlargement $M^3$ at its other end adapted to serve as a means of connecting the bucket with the bucket-carrier.

The tube $M^2$ has transverse pinholes that allow pins or rivets to be driven through the rope or cable in the tube to fasten the inclosed end portion thereof within the tube.

N is a latch pivoted to the upright $F^4$ of the bucket-carrier to engage a striker $N^2$, fixed to the post $B^3$ as required to retain the carrier stationary when the bucket descends into the well. A hole in the latch allows the cable L to pass through, but prevents the enlarged end $M^3$ of the tube $M^2$ from passing through, so that the upward movement of the bucket M will be restricted and the latch N actuated as required to free it from the catch or striker $N^2$ on the post $B^3$ and to allow the bucket-carrier to be advanced toward the post $B^2$ at the other end of the line of posts.

O is a rod slidingly connected with the bottom of the frame of the bucket-carrier by means of suitable bearings. $O^2$ is a catch fixed to the rod and adapted to engage the cone $M^3$ on the tube $M^2$. $O^3$ is a spring that normally presses the rod and catch toward the cable L. $O^4$ is a detent pivoted to the frame and connected with the latch N by means of a projection on the end of the latch extending into a slot in the top portion of the detent, as required to restrict the vibration of the latch and the elevation of the bucket.

P is a lever fulcrumed to the end of the carrier-frame and provided with a longitudinal slot on its top portion, through which the latch N is extended. It serves as a guide for the vibrating latch, and its lower end is connected with the sliding rod O, by means of a link $P^2$, in such a manner that when the bucket-carrier arrives close to the post $B^3$ the upper end of the lever will come in contact with the post, and, being vibrated thereby, will overcome the force of the spring $O^3$ and draw the sliding rod O toward the post, as required to disengage the catch $O^2$ and detent $O^4$ from the cone $M^3$ of the tube $M^2$, so that the bucket can be lowered into the well.

In place of having a rope or cable L of uniform weight and thickness, that portion that winds upon the drum may be comparatively light weight, and that part that descends into the well thicker and heavier.

The drum has two diameters, and the wire rope or cable is fastened to the small end of the drum, so that in raising and lowering the bucket the movement will be slow, and by then winding the wire rope or cable upon the large end of the drum the horizontal movements of the bucket-carrier and bucket will be increased in speed.

In the practical operation of my apparatus it is obvious that the wire or cable B fixed to the line of posts must incline downward from the post $B^2$ toward the post $B^3$, so that the bucket-carrier supported thereon, by means of the pulleys H, will descend from the elevated end to the other end, by force of gravity, as the wire rope or cable L is unwound from the drum of the windlass, and the contact of the lever P and the catch N with the post $B^3$ will actuate the sliding rod as required to release the bucket from the carrier and allow it to descend into the well, while at the same time the latch will engage the catch $N^2$ on the post, as required to retain the carrier stationary; and when the bucket is filled winding the wire or rope L upon the drum will elevate the bucket, and when the cone $M^3$ comes in contact with the catch $O^2$ and detent $O^4$ it will separate them and pass upward to engage and actuate the latch N, as required to detach the carrier from the post $B^3$, while at the same time the said catch and detent will close against the tube $M^2$ below the cone $M^3$ and thereby fasten the bucket to the carrier to be conveyed to the other end of the line of posts; and when the sliding rod O comes in contact with a stop R on the post $B^2$ the trip device, consisting of the catch $O^2$ and the detent $O^4$, will be operated as required to release the bucket from the carrier and to descend and empty.

I claim as my invention—

1. A water elevator and carrier comprising a line of fixed posts, a cable supported upon the tops of the posts, a bucket-carrier having pulleys to travel on the cable, a windlass at one end of the line of posts, a wire or rope fixed to the windlass and extended over a pulley on the bucket-carrier, a bucket on the free end of the rope, trip mechanism for detachably fastening the rope and bucket to the bucket-carrier, a well-curb having wings to direct the bucket and mechanism for detachably fastening the bucket-carrier to one end post, all, arranged and combined to operate in the manner set forth, for the purposes stated.

2. In a water elevator and carrier, a bucket-carrier comprising a frame composed of two straight and parallel bars at its bottom, two uprights fixed to the parallel bars, two straight bars fixed to the central portions of the uprights, a pulley at the top of each upright, a spring-actuated rod slidingly connected with the bottom of the frame, a catch device fixed to the rod, a detent pivoted to the frame to coact with the said catch device on the rod to fasten a bucket and rope to the frame, a latch having an opening in the end for the passage of a rope pivoted to the frame to detachably fasten the frame to a post, a lever pivoted to the frame and connected with the sliding rod by means of a link, and a pulley above the bucket-fastening devices to support a rope, all arranged and combined to operate in the manner set forth, for the purposes stated.

3. In a water elevator and carrier a well-curb having wings at its top portion extending outward substantially as shown and described for the purposes stated.

4. In a water elevator and carrier, the combination of the tube $M^2$ having a hook at one end and a cone M³ at its tubular end and transverse pinholes at its central portion, a rope or cable fastened in said tubular end and a bucket-carrier having two parallel bars at its base, a detent O⁴ fixed between said bars and a catch O² slidingly connected with the said bars and means for actuating the sliding catch in the manner set forth for the purposes stated.

5. An apparatus for elevating water from a well and conveying and emptying a bucket, comprising a line of fixed posts, a cable fixed to the end posts and supported on brackets fixed to the intermediate posts, means for stretching the cable, a bucket-carrier having pulleys adapted to travel on the cable and automatic mechanism for detachably fastening the carrier to a catch device on one of the end posts and automatic mechanism for detachably fastening the carrier to a catch device on one of the end posts and automatic mechanism for detachably fastening the bucket to the carrier, a curb having wings to direct the bucket into the well a windlass at one of the end posts, a rope fixed to the windlass and extended over a pulley on one of the end posts and also over a pulley on the bucket-carrier, a bucket having a valve in its bottom connected with the free end of the rope, and a funnel, having a pin projecting upward to engage the valve in the bucket, fixed to a support near the windlass, all arranged and combined to operate in the manner set forth.

JOHN W. ECKERD.

Witnesses:
A. P. BEEDLE,
S. G. W. STOKES.